F. B. WALTER.
EXTENSION TABLE SLIDE.
APPLICATION FILED FEB. 23, 1915.
1,176,937.
Patented Mar. 28, 1916.
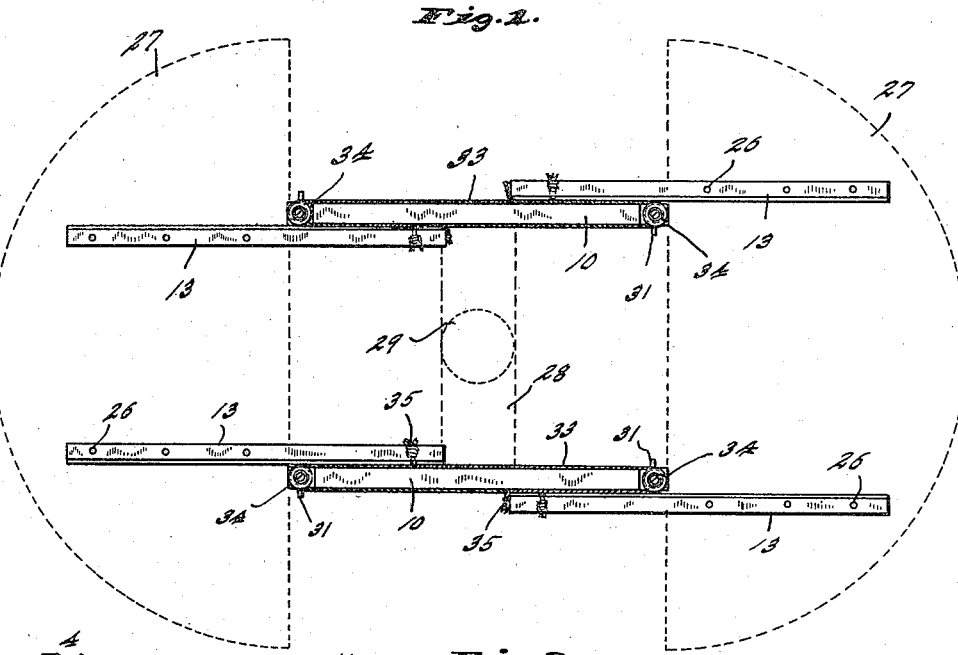
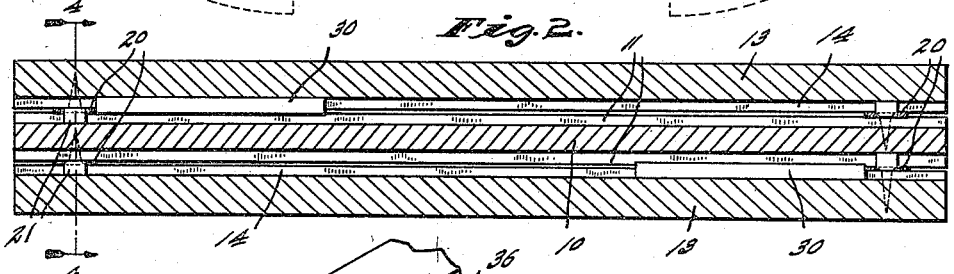
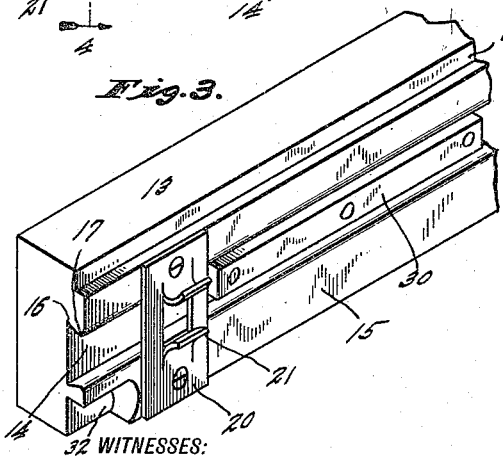
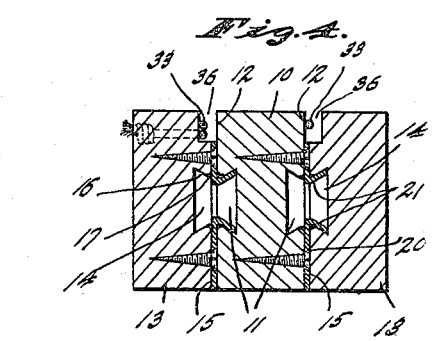
WITNESSES:
INVENTOR
Frederick Bossler Walter
BY
Hood & Schley.
ATTORNEYS

UNITED STATES PATENT OFFICE.

FREDERICK BOSSLER WALTER, OF WABASH, INDIANA.

EXTENSION-TABLE SLIDE.

1,176,937.

Specification of Letters Patent. Patented Mar. 28, 1916.

Application filed February 23, 1915. Serial No. 9,841.

*To all whom it may concern:*

Be it known that I, FREDERICK B. WALTER, a citizen of the United States, residing at Wabash, in the county of Wabash and State of Indiana, have invented a new and useful Extension-Table Slide, of which the following is a specification.

My invention relates to extension table slides. Its object is to provide an extension table slide which will operate with a minimum of friction, and which will not bind even when the table is carrying the heaviest weights.

The accompanying drawing illustrates my invention.

In this drawing Figure 1 is a plan view of two extension table slides embodying my invention, showing the extension table in dotted lines; Fig. 2 is a longitudinal horizontal central section through one of the table slides shown in Fig. 1; Fig. 3 is a perspective view of one end of one of the outside members of the table slide shown in Fig. 2, showing the anti-friction device; and Fig. 4 is a section on the line 4—4 of Fig. 3.

Each table slide consists of a central member 10 provided with a dove-tailed groove 11 on each of its vertical sides 12, and two outer members 13 which are provided with a similar dove-tail groove 14 on one vertical side 15, the two outer members 13 being placed on opposite sides of the central member 10 so that the faces 15 abut against the faces 12 respectively and the grooves 14 come opposite the two grooves 11 respectively. The lower parts 16 of the side walls of the dove-tail grooves 11 and 14, or those parts of such walls which are toward the bottoms of these grooves, are at any usual dove-tail angle to the surfaces 12 and 15, but the upper portions 17 of such walls are rounded off, as is clear from Fig. 4, so that the topmost portions of such walls are at the reverse angle to the surface in which such grooves are cut from the lower portions 16 of such walls. A slide plate 20 having punched up portions or tabs 21 shaped to fit the walls of the grooves 11 or 14 and to lie slidingly against both the portions 17 and 16 thereof is fastened to each surface 12 near one end thereof, being at opposite ends of the member 10 on such two surfaces respectively, and a similar slide plate 20 is fastened to each surface 15 near the opposite end thereof from that to which the guide plate is fastened to the abutting surface 12, as is clear from Fig. 2. These slide plates 20 thus furnish two bearing points between the central member 10 and each of the side members 13, so that the members can be slid longitudinally relatively to each other. The tabs 21 have sufficient bearing surface on the walls of the grooves 11 and 14 to prevent them from cutting into such walls, but nevertheless these surfaces are small enough so as to provide a minimum of friction. In addition, because of the curved edges 17 of the side walls of the grooves 11 and 14, and the interfitting portions of the tabs 21, a binding of the parts by reason of the wedging action of the interengaging dove-tailed surfaces when a heavy load is placed on the outer members is prevented, thereby further reducing the possibility of friction.

The opposite ends of the members 13 from those which are provided with slide plates 20 are suitably attached, as by screws 26, to the under surfaces of the two halves 27 of the table top, and the central members 10 are usually attached to a cross piece 28 at the top of the usual table pedestal 29, if the table is of the pedestal type. The distance to which the two ends 27 of the table top can be separated, and the side members 13 drawn out toward the ends of the central members 10 of the slides, may be limited in any suitable manner, as by blocks 30 which are set in the grooves 11 or 14 or both to engage either with each other or with the slide plates 20 the tabs 21 of which fit into such grooves. The relative movement of the parts of the slides in the other direction may be limited by projecting pins 31 carried by the central members 10 for engaging in notches 32 in those ends of the members 13 near which the plates 20 are attached. Any suitable device may be provided for equalizing the longitudinal movements of the members 13 relative to the member 10, such as a cord 33 passing over pulleys 34 at the ends of the central member 10 and attached at suitable points 35 to the side members 13, the cord 33 lying in grooves 36 in the outer members 13.

I claim as my invention:

1. A table slide, comprising two relatively sliding members having abutting faces, each of such abutting faces having a longitudinally extending dove-tail groove, and a sheet metal slide plate attached to one end of each of such abutting surfaces and provided with integral slide tabs which flare from each other and are each bent more than 90° from their original positions in the plane of the main body of the sheet metal and extend into and fit against the side walls of the groove in the other surface.

2. As an article of manufacture, a slide plate for a table slide, comprising a piece of sheet metal having two tabs cut free from the body of the sheet metal on three sides but attached to the body of the sheet metal at the edge farthest from the other tab, said tabs being bent out of the plane of the body of the sheet metal on the same side of such plane so as to oppose each other, the outer portions of said tabs being bent from the plane of the body of the sheet metal more than 90°, and the portions of said tabs close to where the tabs are attached to the main body of the sheet metal being bent from the plane of the sheet metal less than 90°.

3. As an article of manufacture, a slide plate for a table slide, comprising a piece of sheet metal having two tabs cut free from the body of the sheet metal on three sides but attached to the body of the sheet metal at the edge farthest from the other tab, said tabs being bent out of the plane of the body of the sheet metal on the same side of such plane so as to oppose each other, and the outer portions of said tabs being bent from the plane of the body of the sheet metal more than 90°.

In witness whereof I, FREDERICK BOSSLER WALTER, have hereunto set my hand, at Wabash, Ind., this 17th day of February, A. D. one thousand nine hundred and fifteen.

FREDERICK BOSSLER WALTER.

Witnesses:
M. E. PRICE,
F. F. WILLIAMS.

Copies of this patent may be obtained for five cents each, by addressing the "Commissioner of Patents, Washington, D. C."